Patented Nov. 14, 1922.

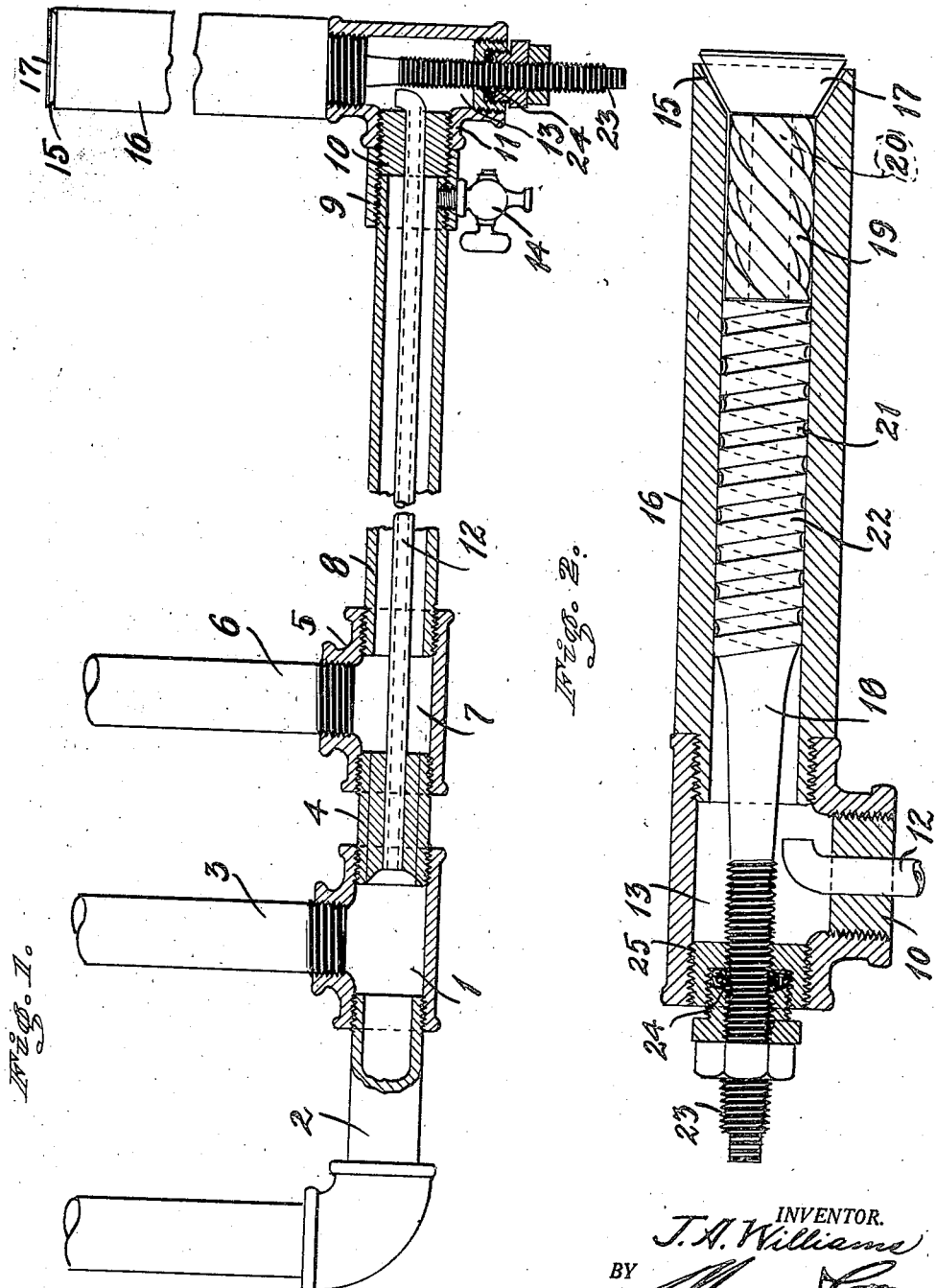

1,435,778

UNITED STATES PATENT OFFICE.

JOSEPH A. WILLIAMS, OF OAKLAND, CALIFORNIA.

OIL BURNER.

Application filed December 21, 1921. Serial No. 523,930.

*To all whom it may concern:*

Be it known that I, JOSEPH A. WILLIAMS, a citizen of the United States, and a resident of Oakland, county of Alameda, and State of California, have invented a new and useful Oil Burner, of which the following is a specification.

My invention relates to oil burners and has for its primary object to provide a burner which is simple in construction, cheap to make, yet embodying certain important mechanical principles which enable it to carry out its intended use with the greatest of efficiency, and accomplish results which have heretofore been absent in devices of this character.

In the accompanying drawing I have illustrated the preferred embodiment of the invention and the same will be used as a basis of explaining the salient features of the invention throughout the following detailed description.

In said drawing, Figure 1 is a plan view partly in longitudinal section of the device assembled, and Figure 2 is a longitudinal section of the nozzle.

Referring now to the drawing in detail, I propose to provide a mixing chamber (1), produced preferably from a three-way union so that it may be introduced into the chamber through an inlet pipe (2) screwed into one end of the union with the oil introduced into the chamber through an inlet pipe (3) screwed in the top of the union. The opposite open end of the union is made to receive a plug (4) with the plug adapted to be screwed into the open end of a second three-way union (5). The top opening of the union (5) is made to receive an inlet pipe (6) so that steam may be introduced into the chamber (7) formed by the union. Screwed into the opposite end of the union (5) is a pipe or casing (8), the opposite end of which being received in the end of a nipple (9) which also carries a plug (10) with the plug protruding beyond the end of the nipple (9) and made to be threaded into the side opening (11) of another three-way union which carries the nozzle, the details of which will be presently described.

Housed within the pipe or casing (8) is a tube (12) which comprises a restricted communication between the mixing chamber (1) and the receiving chamber (13) of the nozzle formed by the last mentioned three-way union. The pipe or casing (8) is made to provide a super-heater for the mixture as it passes through the restricted communication (12) and to block off the pipe or casing (8) at its respective ends. The plug (4) has an axial bore which is made to receive the tube which forms the restricted communication (12) so that the open end of the tube may communicate with the mixing chamber (1) and at the same time block off the mixing chamber (1) from the pipe or casing (8). The opposite end of the pipe or casing (8) is blocked off in a similar manner by the plug (10), as previously mentioned. This enables steam to be introduced through the inlet pipe (6) to the casing (8), and to relieve the water of condensation a valve (14) is arranged as shown in Figure 1.

The end of the plug (4) within the mixing chamber (1) is dished out as shown and the tube (12) is raised or otherwise fixed in the bore of the plug to make a perfectly tight fit. The end of the tube (12) which terminates in the receiving chamber (13) of the nozzle is turned at right angles so as to leave a discharge pointed in the direction of the discharge end (15) of the nozzle (16). The nozzle (16) preferably comprises a cylinder with the discharge end (15) thereof made with a beveled seat adapted to correspond to the frustum shaped valve head (17) which is carried on the end of the core insert (18) and adapted to be adjusted relative to the beveled seat of the discharge end (15) of the nozzle to control the effective port area of the discharge to a nicety. Adjacent the valve head (17) is a spiral fluted sleeve (19) which is mounted with freedom of rotation on the restricted end (20) of the core insert with the spirals thereof arranged at a slant to the axis of the nozzle so as to communicate with the spirals (21) of the core (22). The core (22) is of substantially the same diameter as that of the inside dimensions of the cylinder so that the mixture is caused to take a tortuous passage in reaching the fluted sleeve (19) where it will be released through the discharge end of the nozzle in a whirling motion, thus resulting in a fine mist which is readily ignited and very easy for the flame to totally consume all of the products of the mixture, leaving no smoke or carbon.

The core (22) terminates in the threaded stem (23) which extends through a stuffing box (24) in the plug (25) which closes one end of the three-way union whereby the core insert may be turned in a clockwise or anti-clockwise direction so as to adjust the valve head (17) relative to its seat in the discharge end of the nozzle for controlling the flame. The cylinder of the nozzle is preferably threaded into the opposite end of the union from the plug (25) as best shown in Figure 2. The gradual taper of the stem increases the area of the receiving chamber (13), as best shown in Figure 2, which is highly desirable for the results to be accomplished.

From the above it will be readily seen that I have provided a mechanically perfect solution of the problems involved in a burner of this character, and furthermore it is to be likewise noted that the device may be made up practically from standard fittings, which cheapens its constructions and which will enable it to be offered on the market at a comparatively cheap price.

I claim:

In an oil burner, a mixing chamber, steam and oil inlets therein, a nozzle, a relatively small tube connecting the mixing chamber and the nozzle, a super-heater for said tube comprising a casing extending substantially the length of the said tube and surrounding the same, and a steam inlet into said casing, said nozzle comprising a cylinder having a receiving chamber in one end and a discharge at its opposite end, a core insert for said cylinder, said core insert including a stem extending through one end of the receiving chamber, the intermediate portion of said core insert having a diameter of substantially that of the inside diameter of the cylinder and spiral grooves in said intermediate portion, a reduced portion in front of the intermediate portion, a spiral fluted sleeve mounted with freedom of rotation on said reduced portion, and a frustum shaped valve head on the extremity of the core insert in front of said spiral fluted sleeve, said head adapted to adjustably control the port area of the discharge end of the nozzle with a seat in the discharge end of the nozzle made to correspond with the frustum shape of said head.

JOSEPH A. WILLIAMS.